Nov. 9, 1926.
O. BUYS
1,606,345
ELECTRIC METER CONSTRUCTION
Filed Dec. 21, 1922      2 Sheets-Sheet 1
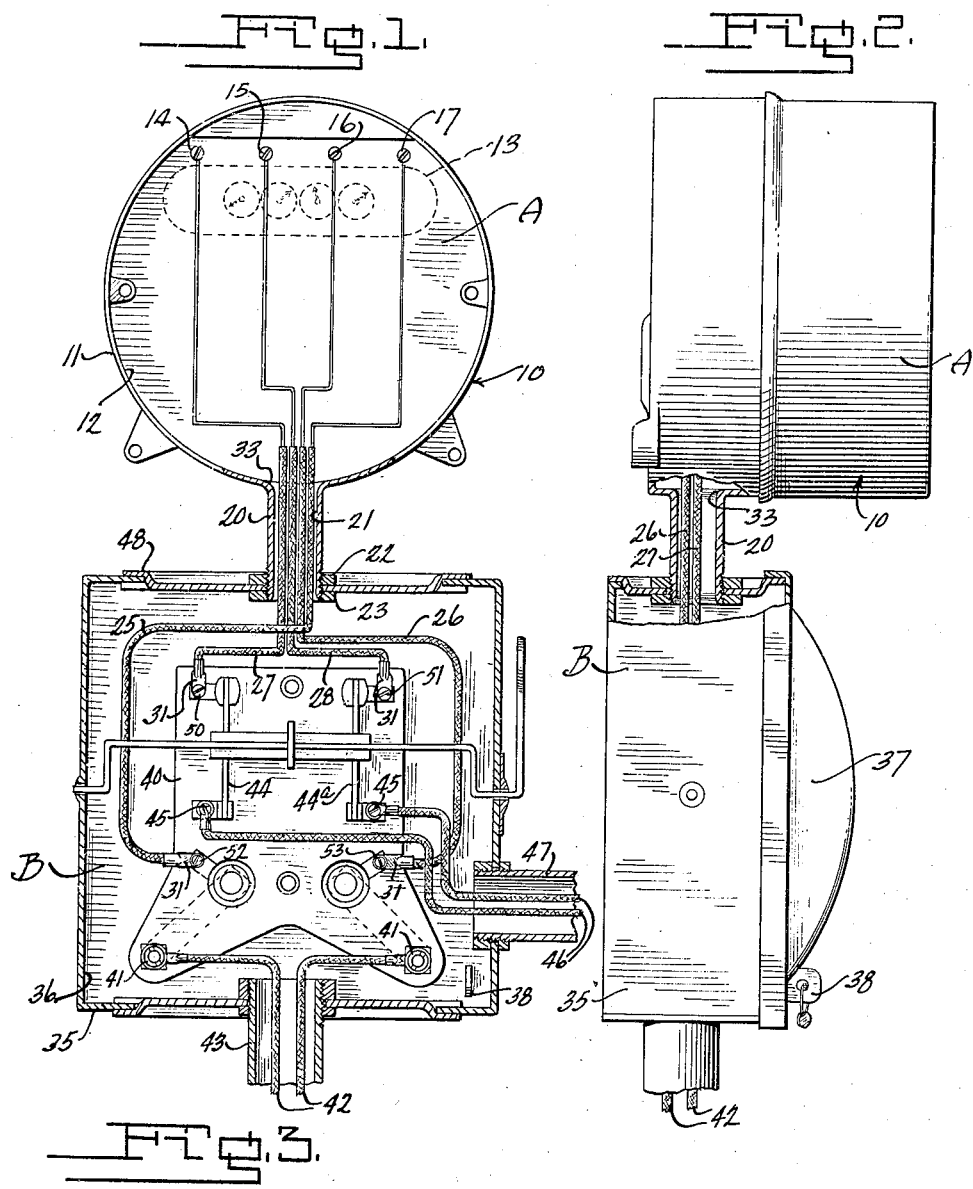
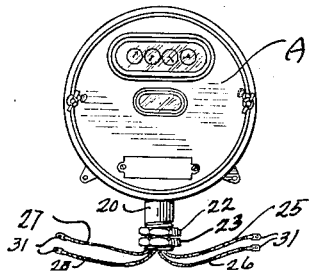
Inventor
Orville Buys
By [signatures]
Attorneys Nov. 9, 1926.  
O. BUYS  
1,606,345  
ELECTRIC METER CONSTRUCTION  
Filed Dec. 21, 1922  2 Sheets-Sheet 2
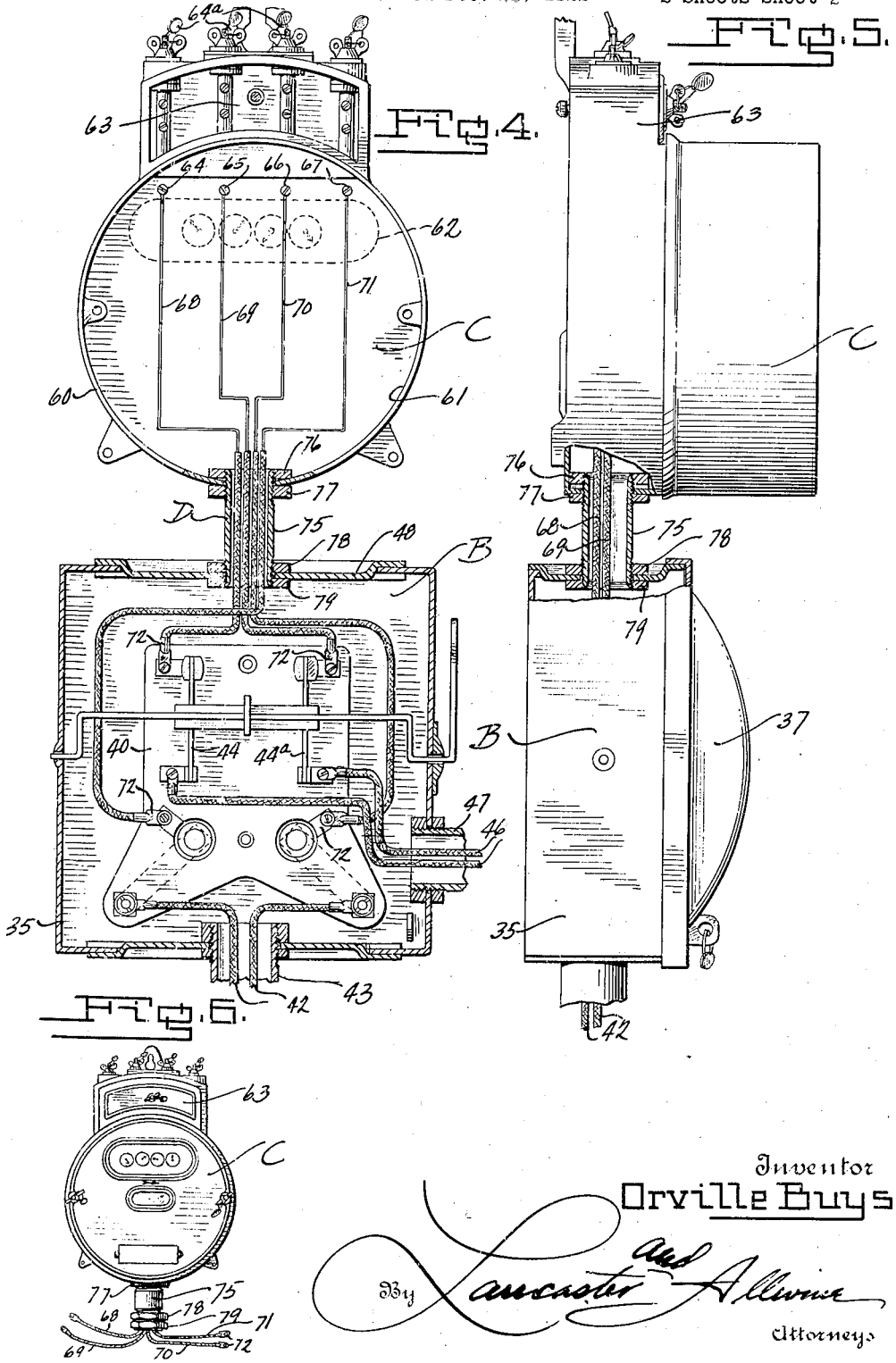
Inventor  
Orville Buys  
By Lancaster Allwine  
Attorneys Patented Nov. 9, 1926.

1,606,345

UNITED STATES PATENT OFFICE.

ORVILLE BUYS, OF PITTSBURGH, PENNSYLVANIA.

ELECTRIC-METER CONSTRUCTION.

Application filed December 21, 1922. Serial No. 608,226.

This invention relates to improvements in electric meters and the connections for the wiring thereof.

The primary object of this invention is the provision of an improved meter for the measuring of electric current consumption, embodying an improved wiring arrangement as a permanent part thereof, which is adapted for connection to a safety switch or similar structure in simple and economical manner, whereby unauthorized persons may not tamper with the same.

A further object of this invention is the provision of conduit means adapted for use intermediate the safety switch structure and meter of electrical equipment, whereby connecting wires may be protected in the best and simplest manner, dispensing with the provision of expensive meter protective trims or adapters, and obviating the necessity of providing terminal chambers and blocks in connection with the meter.

A further object of this invention is the provision of permanent wire leads for electric meters, and conduit means for the same, of the above mentioned character which are adapted for use in connection with conventional and existing types of meters, necessitating little alteration to such meters, or which may be embodied as a unitary part of a meter assembly, materially simplifying the same over the complicated and expensive constructions necessary in the connecting of the same with an electric circuit, or in connection with a switch structure.

Other objects and advantages of this invention will be apparent during the course of the following detailed description.

In the accompanying drawings, forming a part of this specification, and wherein similar reference characters designate corresponding parts throughout the several views.

Figure 1 is a cross sectional view, showing an improved meter casing and wiring means therefor as used in connection with an encased switch structure.

Figure 2 is a side elevation of the improved arrangement illustrated in Figure 1, showing improved parts thereof in cross section.

Figure 3 is a front elevation of the improved details of the meter illustrated in Figure 1.

Figure 4 is a cross sectional view, showing certain details of a conventional electric meter, and the novel means of wiring and connecting the same to a safety switch structure.

Figure 5 is a side elevation, partly in section, of the elements illustrated in Figure 4.

Figure 6 is a front elevation of the type of meter and connection therefor as illustrated in Figure 4.

In the drawings, wherein for the purpose of illustration are shown several embodiments of this invention, the letter A designates an improved meter embodying novel features to be installed during manufacture of the meter for association with a switch device B. The ordinary type of meter C may embody improvements D, as will be subsequently described, for association with the type of switch structure B.

Referring to the preferred embodiment of this invention, as illustrated in Figures 1, 2, and 3, the meter A includes the casing 10, which is preferably of cast metal, providing the body portion 11 of cylindrical formation, within the chamber 12 of which the electric current registering mechanism 13 is mounted, as in any approved manner, and providing binding posts 14, 15, 16 and 17 in the chamber 12. A conduit 20 of ordinary conduit size may be provided, integral with the casing body 11, and extending radially thereof, providing a relatively large passageway 21, which communicates directly with the chamber 12, and may have the lower end thereof exteriorly screw threaded to receive the binding nuts 22 and 23 adjustably carried thereon, for use in connection with the clamping of the meter with the switch structure B, as will be subsequently described.

In order to do away with the ordinary meter loop provided by electricians during wiring of a building, it is preferred to provide the improved meter A with permanent wire connections. To this end, the wire lengths 25, 26, 27, and 28 are provided, which are connected to the binding posts 14, 15, 16 and 17 within the chamber 12 of the meter casing 10; said wires preferably having terminal lugs 31 upon their ends. These wires 25, 26, 27, and 28 are bunched together and led exteriorly of the meter casing 10, through the passageway 21 of the conduit 20, so that the terminal lugs 31 and a portion of each of said wires extend exteriorly of the conduit 20, as is illustrated in Figure 3 of the drawings.

By the arrangement of the wires 25 to 28 as above described, the ordinary terminal chamber provided in a meter casing is done away with, and a very simple and economical construction is effected; said wires being a permanent part of the meter, and adapted for use in connection with the switch structure B, which may be effected in quick and convenient manner, and in a minimum of the time ordinarily consumed in attaching a meter within the ordinary meter loop. As an aid in protecting the wires 25, 26, 27 and 28, it is to be noted that the juncture of the nipple or conduit 20 with the body 11 of the casing 10 is interiorly arcuated, as at 33, so that there will be no liability of the wires binding against a sharp edge at this point.

The switch structure B, which may be of any approved type, may be used in connection with preferred and modified forms of this invention, and generally includes the sealed cabinet or box 35, providing a compartment 36 access to which may be had through a closure member 37 hinged to the box 35, and which may be sealed by an arrangement 38. Within the chamber 36 of this box or receptacle 35, the insulation plate 40 is ordinarily mounted, having binding posts 41 therein for connection of the service line wires 42; said wires preferably entering the cabinet or box 35 through a conduit 43. Switch blades 44 are pivoted on the insulation block 40, and at their pivot points have the binding posts 45, which ordinarily connect the load wires 46; said load wires preferably passing from the cabinet or box 35 through a conduit 47.

Referring again to the meter A, the same is preferably connected to the switch box 35 at the top 48 thereof, as by having the conduit 20 inserted through an opening in said top 48; the nuts 22 and 23 being exteriorly and interiorly disposed respectively on the switch box top 48 for the clamping of the meter casing 10, so that the meter leads 25, 26, 27, and 28 enter the chamber 36. Binding posts 50 and 51 are provided for respective conducting cooperation with the blades 44 and 44ª. The leads 25 and 26 are clamped on the insulation block 40 at binding posts 52 and 53 to be in circuit with the surface line wires 42, so that said wires 25 and 26 direct the current into the meter A to operate the measuring mechanism 13 therein. The wires 27 and 28 on the other hand, are connected to the binding posts 50 and 51, so that current leaves the meter through these wires, and when the switch blades 44 and 44ª are closed, the current passes through the load wires 46, as can be readily understood.

From the foregoing description of the preferred form of this invention, it is obvious that a meter has been provided which is materially simplified over existing types of meters, in that complicated terminal blocks and like structures are done away with and a simple wiring arrangement is attached as a permanent part of the meter, which can be connected with ease and dispatch to the safety switch structure B, thus doing away with the necessity of providing a meter loop and connecting the same in the ordinary time consuming manner. In addition, the wires leading to the meter are assembled in compact manner, and protected against liability of unauthorized persons tampering with the same in much better manner than is effected by the complicated and many forms of meter trims or adaptors now on the market.

Referring to the meter C, which is representative of the types of meters heretofore manufactured, the same embodies the improved features D by means of which the same can be attached to the switch structure B. This meter C includes the casing 60, providing the compartment 61 therein which receives the current recording mechanism 62 of any approved type. An ordinary feature of this type of meter, is the terminal box or device 63, and which embodies a complicated arrangement for connecting service and load wires to the terminals 64, 65, 66 and 67 of the mechanism 62. This has been rendered inoperative by sealing the terminals as at 64ª.

Referring to the improved features D, the same contemplate the provision of wire leads or lengths 68, 69, 70, and 71, which are respectively connected at their ends to the binding posts 64, 65, 66 and 67, within the chamber 61; said wires having at their ends the terminal lugs 72. A standard pipe length or conduit 75 is provided, having the upper and lower ends thereof exteriorly screw threaded. The upper end receives the nuts 76 and 77, which are adjusted for attachment to the screw threaded end of the pipe or conduit 75, so that the latter may be attached to the casing 60, as to extend radially through an opening thereof; the nut 76 being interiorly positioned in the chamber of said casing, while the nut 77 is exteriorly positioned, so that the pipe 75 may be clamped as illustrated in Figure 4 of the drawings. The lower screw threaded end of the conduit 75 supports the nuts 78 and 79 for clamping of the conduit 75 to the top 48 of the switch box 35, in a manner altogether similar to that described for the preferred embodiment of this invention.

The wires 68, 69, 70 and 71 are led downwardly through the passageway of the conduit 75 into the compartment 36 of the switch box 35, and there connected so that the wires 70 and 71 are connected to the service lead wires 42, while the wires 68 and 69 are directly connected, by way of the switch structure, to the load wires 46.

From the foregoing description of this invention, it is apparent that the improvements and modifications made to electric meters and as herein set forth do away with the cumbersome provision of meter loops and the expensive and time consuming methods of connecting the same. Also, the ordinary meter trims and adapters are dispensed with in the economical provision of the conduit intermediate the meter and the switch structure.

The simple conduits for receiving the permanent wire leads in bunched relation may be of various materials and different formations. One or more of these conduits may be used, which may be of insulation, or conducting material, either permanently located as a part of the meter location, or detachable therewith. The conduit may extend radially from the casing, from the front thereof, or from the rear wall thereof, in the most convenient position for attachment to the switch structure or analogous device. The principle of this invention may be also used in connection with transformers, motors, arc and incandescent lights, relays, and other electrical apparatus where a plurality of wires leave the apparatus, in substantially the manner described in this invention.

Various other changes in the shape, size and arrangement of parts may be made to the form of the invention herein shown and described, without departing from the spirit of the invention or the scope of the claims.

I claim:

1. In a meter construction the combination of a watt-hour meter for measuring electric current including a casing, a single tubular conduit of ordinary conduit size extending outwardly in connected relation with the casing, lead wires connected within the casing of the watt-hour meter, and all of which are introduced through said single conduit.

2. In combination with a top connected type of watt-hour meter including a plurality of top terminals exterior of the meter casing chamber and including binding posts disposed within the chamber of the meter casing, means inoperatively sealing said terminals at the top of the meter casing to prevent unauthorized tampering with the meter, a single conduit of ordinary conduit size extending from said meter casing providing a passageway therethrough communicating with the chamber of the meter casing, and current inleading and outleading wires connected to said binding posts in the meter casing and all leading exteriorly of the meter thru said conduit.

3. In a meter construction the combination of a watt-hour meter for measuring electric current including a sealed casing having a tubular nipple of standard size rigidly secured thereto and provided with means whereby it may be secured in an opening in a switch box apparatus, and service and load connecting wires connected to measuring mechanism in the casing and extending therefrom thru said nipple.

4. In an electric meter including a current measuring mechanism and a sealed casing provided with an aperture therein, a single tubular conduit of ordinary size extended at one end into said aperture, said end of the nipple being threaded and having nuts thereon at opposite sides of the casing aperture for clamping the nipple in place rigid with the casing, means at the outer end of said nipple for connecting the same with a housing, and service and load connecting wires connected with the measuring mechanism in said casing and all extending thru said nipple exteriorly thereof.

ORVILLE BUYS.